(12) United States Patent
Yoshiura et al.

(10) Patent No.: US 6,711,276 B1
(45) Date of Patent: Mar. 23, 2004

(54) CONTROL METHOD AND APPARATUS FOR EMBEDDING INFORMATION IN DATA

(75) Inventors: Hiroshi Yoshiura, Tokyo (JP); Isao Echizen, Yokohama (JP); Takao Arai, Yokohama (JP); Hiroyuki Kimura, Hiratsuka (JP); Toshifumi Takeuchi, Tokyo (JP); Yoshiaki Moriyama, Tsurugashima (JP); Kazumi Sugaya, Tsurugashima (JP); Akira Ogino, Tokyo (JP)

(73) Assignees: Hitachi, Ltd., Tokyo (JP); Sony Corporation, Tokyo (JP); Pioneer Electric Corporation, Tokyo (JP)

( * ) Notice: Subject to any disclaimer, the term of this patent is extended or adjusted under 35 U.S.C. 154(b) by 0 days.

(21) Appl. No.: 09/453,578

(22) Filed: Dec. 3, 1999

(30) Foreign Application Priority Data

Dec. 3, 1998 (JP) .......................................... 10-343888

(51) Int. Cl.$^7$ .............................. G06K 9/00; H04L 9/00
(52) U.S. Cl. ......................... 382/100; 382/232; 380/51; 380/54; 713/176
(58) Field of Search ................................ 382/100, 232; 380/51, 54; 713/176

(56) References Cited

U.S. PATENT DOCUMENTS

| | | | |
|---|---|---|---|
| 5,659,726 A | | 8/1997 | Sandford, II et al. |
| 5,724,073 A | | 3/1998 | Hino et al. |
| 5,819,289 A | | 10/1998 | Sanford, II et al. |
| 5,848,155 A | | 12/1998 | Cox |
| 5,960,081 A | * | 9/1999 | Vynne et al. ................ 348/461 |
| 5,970,140 A | * | 10/1999 | Sandford et al. ............ 380/205 |
| 6,104,826 A | * | 8/2000 | Nakagawa et al. .......... 382/100 |

FOREIGN PATENT DOCUMENTS

| | | |
|---|---|---|
| EP | 828372 | 3/1998 |
| EP | 860984 | 8/1998 |
| JP | 10290406 | 10/1998 |
| JP | 10290456 | 10/1998 |
| WO | 9803014 | 1/1998 |

OTHER PUBLICATIONS

L. Qiao, et al, Watermarking Methods for MPEG Encoded Video: Towards Resolving Rightful Ownership, Department of Computer Science University of Illinois, pp. 1–15.

Boundaries of Communication, Digital Communication—Messerschnitt, 1988, pp 77–79.

K. Kido, et al, Improvements of MRI Image Quality Using Directional Adaptive Filter, *The Transactions of the Institute of Electronics, Information and Communication engineer (IEICE)*, D–II, vol. J79–D–II, No. 8, pp. 1347–1353, Aug. 1996.

(List continued on next page.)

*Primary Examiner*—Jayanti K. Patel
*Assistant Examiner*—Aaron Carter
(74) *Attorney, Agent, or Firm*—Antonelli, Terry, Stout & Krauss, LLP

(57) ABSTRACT

A watermark information embedding method, and apparatus, capable of suppressing the quality degradation of contents and increasing the survivability of embedded information. When embedding watermark information in moving picture data formed of a plurality of still picture frames arranged in time series, a motion vector representing a property specific to moving picture is detected for each of image blocks generated by dividing a target frame. According to a motion quantity, a pixel change factor specifying rule is selected for each block. Out of pixels permitted to be changed in luminance depending upon the state of an image in each block representing a property specific to still picture, as many pixels as a number specified by the selected rule are selected. Luminance change processing for forming watermark information is conducted on the selected pixels.

17 Claims, 10 Drawing Sheets

OTHER PUBLICATIONS

The Transactions of the Information Processing Society of Japan, vol. 38, No. 12, 1997, pp. 2640–2647.

1997 Symposium on Cryptography and Information Security, 31–G, 31–F.

"Foundation of Digital Image Compression", Nikkei BP Publication Center, 1996, pp. 44–47.

The Transactions of the Institute of Electronics, Information and Communication Engineer (IEICE), vol. J79–D–2, No. 8, pp. 1347–1353.

* cited by examiner

FIG. 4

| BLOCK | MOTION VECTOR |
|---|---|
| 1 | (x1,y1) |
| 2 | (x2,y2) |
| ... | ... |
| i | (xi,yi) |
| ... | ... |
| N | (xN,yN) |

FIG. 5

R1 : IF MAGNITUDE OF MOTION VECTOR IS LESS THAN A1, THEN SELECT
WATERMARK INTENSITY SPECIFICATION TABLE 1.

R2 : IF MAGNITUDE OF MOTION VECTOR IS AT LEAST A1 AND LESS THAN A2,
THEN SELECT WATERMARK INTENSITY SPECIFICATION TABLE 2.

R3 : IF MAGNITUDE OF MOTION VECTOR IS AT LEAST A2 AND LESS THAN A3,
THEN SELECT WATERMARK INTENSITY SPECIFICATION TABLE 3.

| 320a | 320b | 320c |
|---|---|---|
| CHANGE EASINESS DEGREE OF BLOCK | INTER-BLOCK CHANGE FACTOR (THE NUMBER OF CHANGED PIXELS / THE NUMBER OF PIXELS IN BLOCK) | CHANGE QUANTITY OF EACH PIXEL |
| 0 | 0 | 0 |
| AT LEAST 0 AND LESS THAN 0.5 | 25 | 1 |
| AT LEAST 0.5 AND LESS THAN 1.0 | 50 | 2 |
| ----- | ----- | ----- |

CONTROL METHOD AND APPARATUS FOR EMBEDDING INFORMATION IN DATA

BACKGROUND OF THE INVENTION

The present invention relates to an information embedding method, and apparatus. In particular, the present invention relates to a method, and apparatus, for embedding information such as copy control information and copyright information in digitized contents information of a still picture or moving picture, and to a program medium for implementing the method.

In recent years, contents of images and music have been digitized and circulated via storage media or communication networks. In order to protect the copyright of such digitized contents information, a digital watermark technique is regarded as important. In this digital watermark technique, copy control information and copyright information are embedded in contents information by making a change of such a degree as not to be noticed by human visual and auditory senses in the contents information. As a result, it is possible to limit the number of times of copy of contents information utilizing data processing apparatuses or specify the copyright holder on the basis of illegally copied contents information.

For putting the digital watermark technique to practical use, it is necessary to satisfy the following two requirements.

(1) Suppression of degradation of contents information:

For example, in embedding digital watermark information in image data, a change made in image must not prevent enjoyment of contents. In other words, a change made in a part of contents information must not be conspicuous to human visual and auditory senses.

(2) Improvement of survivability:

Even if image processing and voice processing are applied, embedded information, i.e., a change made in contents information must not be easily degraded.

For satisfying the above described conditions, it is necessary to optimize change positions and degrees or intensities of changes in contents according to the property of the contents. By taking an image which is representative of contents information, as an example, conventional digital watermark techniques will hereafter be analyzed.

In the case of image data, making an unsuitable change in a state value (luminance or color) of a pixel in such an area that the state change of an image is comparatively flat typically causes conspicuous unnaturalness in the changed position. However, a portion where a pixel value variation is violent, such as an edge portion of a subject, has a property that a comparatively large change made in pixels is not conspicuous to human eyes. Paying attention to this property, a digital watermark technique of edge preservation type has been proposed in, for example, The Transactions of the Information Processing Society of Japan, Vol. 38, No. 12, 1997, pp. 2640–2647. In this technique, an edge portion of a subject is identified by analyzing the luminance variation of an image frame in which watermark information should be embedded. In the above described edge portion where a pixel value change is hard to be conspicuous, a large change is made. In a portion where a pixel value change is easy to be conspicuous, a change is not made, or the degree of a change is made low even if the change is made.

The subject of embedding of digital watermark information is not limited to still pictures, but moving pictures also become the subject. Moving picture data is formed of a plurality of still picture frames arranged in time series. In some cases, the frame feed is stopped during enjoyment of a moving picture to enjoy individual frames as still pictures.

In embedding digital watermark information in a moving picture, it is necessary to make pixel value change positions inconspicuous in both the still picture state and the moving picture state, for the above described reason. Therefore, it is desirable to optimize pixels to be changed and the degree of the change by considering both the property as viewed as a still picture and the property as viewed as a moving picture. As for conventional techniques concerning embedding digital watermark information in a moving picture, however, only the property as viewed as a still picture is considered in, for example, a system reported in 1997 Symposium on Cryptography and Information Security, 31-G. On the other hand, in a system reported in 1997 Symposium on Cryptography and Information Security, 31-F, only the property as viewed as a moving picture is considered. There has not been proposed yet an example in which pixel value change positions and/or change intensities are optimized by considering both the property as viewed as a still picture and the property as viewed as a moving picture.

Furthermore, conspicuousness of a pixel value change does not depend upon only one property such as, for example, a luminance variation, but differs according to a property other than luminance such as a color variation. When embedding watermark information in a still picture or a moving picture, therefore, it is necessary to optimize change positions and degrees of the change, i.e., change intensities while considering these plural properties. In conventional digital watermark techniques, however, the pixel value change is optimized depending upon one property of an image. An optimization technique considering a plurality of properties has been neither proposed nor well known.

SUMMARY OF THE INVENTION

A first object of the present invention is to provide a technique of optimizing change positions i.e., change positions and/or change intensities on the basis of a plurality of properties possessed by contents information in which watermark information should be embedded.

A second object of the present invention is to provide a method, and apparatus, for embedding watermark information in a moving picture optimized in change position and/or change intensities on the basis of both the property as viewed as a moving picture and the property as viewed as a still picture.

Another object of the present invention is to provide a computer program for implementing the above described information embedding method, and contents information obtained by implementing the method.

In order to achieve the above described first object, an information embedding method according to an aspect of the present invention includes a step of determining a plurality of change positions and/or change degrees of states respectively depending upon a plurality of properties possessed by contents information serving as an embedding subject of watermark information, a step of selecting change positions and/or change degrees to be applied to each of sub-contents information pieces representing divisional contents information according to the contents information, among the plurality of change positions and/or change degrees determined on the basis of the respective properties, and a step of making a change serving as watermark information in the contents information in accordance with the selected change positions and/or change degrees.

In a more concrete aspect, the information embedding method includes the steps of dividing contents information serving as an embedding subject of watermark information into a plurality of information blocks, determining change positions and/or change degrees for the information blocks, and for each of information blocks, selecting at least one among the determined change positions and/or change degrees according to contents information of the information block.

If priority is given to inconspicuousness of the change, then, for example, a result of a logical product (AND) operation conducted on change positions and/or change degrees selected for respective properties may be used as final change positions and/or change degrees at the selection step so as to minimize the number of change positions and/or change degrees. On the other hand, if priority is given to survivability of the change result, than a result of a logical sum (OR) operation conducted on change positions and/or change degrees selected for respective properties may be used as final change positions and/or change degrees at the selection step so as to maximize the number of change positions and/or change degrees.

In order to achieve the above described first object, an information embedding method according to another aspect of the present invention includes a first step of determining change positions and/or change degrees of states on the basis of a first property possessed by contents information serving as an embedding subject of watermark information, a second step of amending at least a part of change positions and/or change degrees determined at the first step, on the basis of a second property possessed by contents information different from the first property, and a third step of making a change serving as watermark information in the contents information according to the amended change positions and/or change degrees.

In order to achieve the above described first object, an information embedding method according to still another aspect of the present invention includes a first step of selecting at least one among a plurality of rules prepared beforehand, on the basis of a first property possessed by contents information serving as an embedding subject of watermark information, a second step of determining change position and/or change degree candidates of the contents information on the basis of a second property possessed by contents information, a third step of determining at least one change position and/or change degree out of the change position and/or change degree candidates, based upon a rule selected at the first step, and a fourth step of changing a state of the contents information in the selected change position and/or change degree.

In accordance with the present invention, each of the above described plurality of rules is provided with a content for prescribing change positions and/or change degrees according to one property of the contents information. By applying one rule selected on the basis of another property of the contents information, change positions and/or change degree can be determined in such a form as to take a plurality of properties possessed by the contents information into consideration.

In order to achieve the above described second object, in accordance with an aspect of the present invention, an information embedding method of embedding watermark information by making a change in moving picture data formed of a plurality of still picture frames includes a first step of determining change positions and/or change degrees on the basis of a property as viewed as a still picture, detected from a still picture frame to be processed, a second step of determining change position candidates and/or change degree candidates on the basis of a property as viewed as a moving picture, detected from a relation between images contained in the still picture frame to be processed and another still picture frame, a third step of selecting change positions and/or change degrees to be applied to the still picture frame among the change position candidates and/or change degree candidates respectively determined at the first and second steps, and a fourth step of making a pixel change serving as watermark information in the still picture frame to be processed in accordance with the selected set of change positions and/or change degrees.

In order to achieve the above described second object, in accordance with another aspect of the present invention, an information embedding method of embedding watermark information by making a change in moving picture data formed of a plurality of still picture frames includes a first step of determining change positions and/or change degrees on the basis of a property as viewed as a still picture, possessed by each of the still picture frames, a second step of modifying at least a part of the change positions and/or change degrees determined at the first step, on the basis of a property as viewed as a moving picture, determined from a relation between the still picture frames, and a third step of making a pixel change serving as watermark information in the still picture frame in accordance with the modified change positions and/or change degrees.

In order to achieve the above described second object, in accordance with still another aspect of the present invention, an information embedding method of embedding watermark information by making a change in moving picture data formed of a plurality of still picture frames includes a first step of selecting one among a plurality of rules prepared beforehand, on the basis of a property as viewed as a moving picture, detected from a relation between images contained in the still picture frame to be processed and another still picture frame, a second step of determining change positions and/or change degrees in the still picture frame on the basis of a property as viewed as a still picture, detected from the still picture frame to be processed, using the determined rule, and a third step of changing a pixel state of the still picture frame in the selected change position and/or change degree.

In a more concrete aspect of the foregoing aspects, each of the still picture frames is divided into a plurality of image blocks, and the above described series of processing steps are executed for each image block. As the property as viewed as a still picture, for example, a luminance variation in each still picture frame or in each image block may be considered. As the property as viewed as a moving picture, a motion quantity, i.e., the magnitude of a motion vector between still picture frames may be considered.

An information embedding apparatus according to the present invention includes a processor for executing the above described steps by means of program processing, and a storage device for storing contents information to be processed and other data. Its specific configuration will become clear by embodiments described hereafter.

Other objects, features and advantages of the present invention will become apparent from the description of the following embodiments taken in conjunction with the accompanying drawing.

BRIEF DESCRIPTION OF THE DRAWING

FIG. 4 is a diagram showing a result of motion detection of each block conducted by the inter-still-picture-frame motion detection routine 22;

FIG. 5 is a diagram showing a decision criterion of rule selection possessed by a rule selection routine 23 illustrated in FIG. 2;

FIG. 8 is a diagram showing another example of an information embedding rule;

DESCRIPTION OF THE EMBODIMENTS

A first embodiment of the present invention will now be described in detail by referring to FIGS. 1 through 8.

In the present embodiment, a moving picture is considered as contents information. Moving picture data includes a plurality of still picture frames. By making a change in a part of pixels of each still picture frame, watermark information can be embedded in the moving picture. In an embodiment hereafter described, luminance of a specific pixel selected out of each still picture frame is changed in such a range as not to give a sense of incompatibility to human eyes. These changes are made unreadable from human eyes to ensure security.

Figure 1:
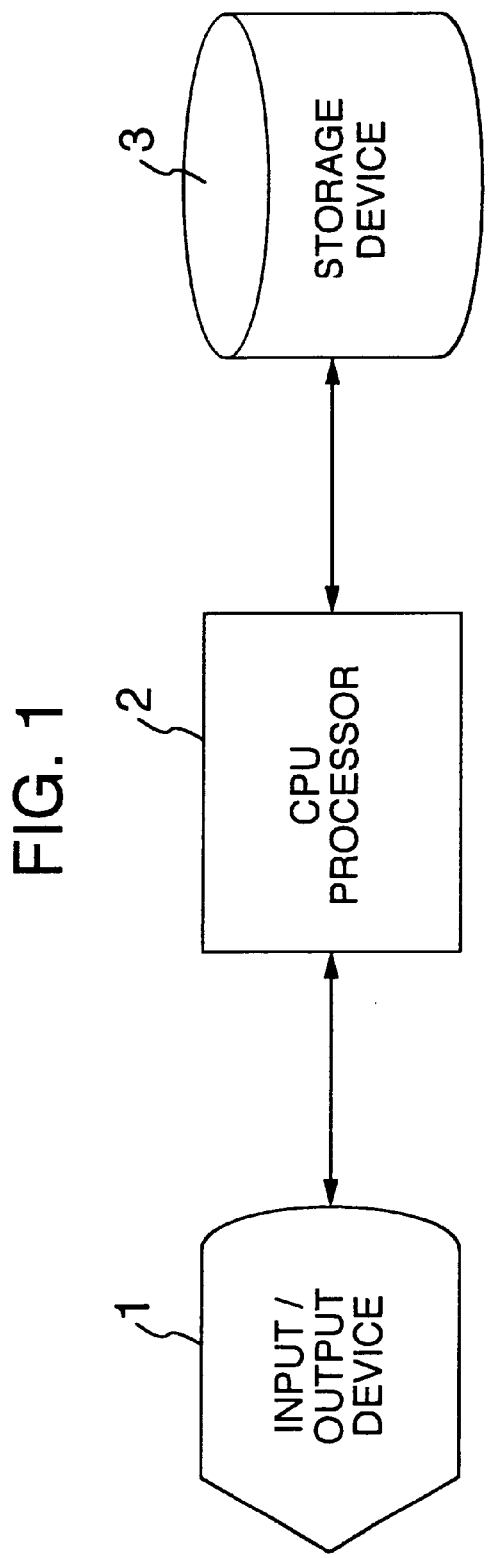
FIG. 1 is a hardware configuration diagram for implementing digital watermark information embedding according to the present invention.

FIG. 1 shows a hardware configuration for implementing digital watermark information embedding according to the present embodiment. Numeral 1 denotes an input/output device for inputting data, such as moving picture data in which watermark information should be embedded, watermark information, and various rules described later, and outputting a moving picture with watermark information embedded therein. Numeral 2 denotes a central processing unit (processor). Numeral 3 denotes a storage device for storing moving picture data inputted from the input/output device and moving picture data with watermark information embedded therein. The storage device 3 is utilized to store not only moving picture data required for watermark information embedding processing but also various data, rules, and programs used by the central processing unit. In actual application, a storage device for storing programs and computer data are prepared separately from a storage device for storing images requiring a large storage capacity. Here, however, those storage devices are illustrated as a single storage device for brevity.

The central processing unit 2 compares each of still picture frames forming a moving picture with a subsequent frame which appears with a delay of a predetermined number of frames on the time axis, and thereby detects a motion of a subject, i.e., the property as viewed as a moving picture. On the basis of both the property of an image of each frame as viewed as a still picture and the property of the image of each frame as viewed as a moving picture, the central processing unit selects embedding positions of watermark information and determines change quantities of pixel values in those positions.

Figure 2:
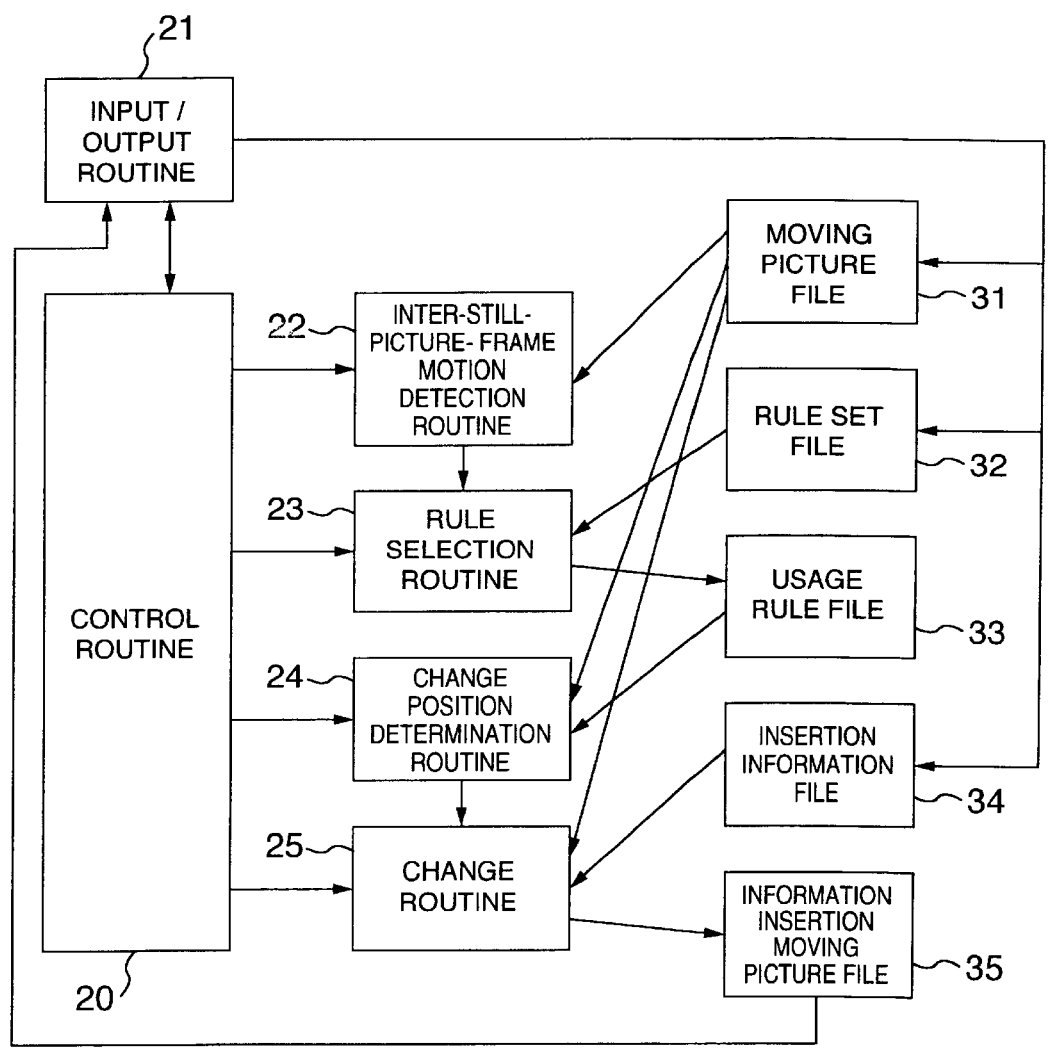
FIG. 2 is a functional block diagram showing a first embodiment of digital watermark information embedding according to the present invention.

FIG. 2 is a functional block diagram showing a digital watermark information embedding according to the first embodiment of the present invention, which is implemented by program operation executed by the central processing unit 2.

Functional blocks 20 through 25 represent processing routines, i.e., programs, executed by the central processing unit 2. Functional blocks 31 through 35 represent data files formed in the storage device 3. For example, numeral 31 denotes a moving picture file for storing moving picture data including a plurality of still picture frames. Numeral 32 denotes a rule set file for storing a plurality of rules exemplified in FIG. 5. Numeral 33 denotes a usage rule file for storing a rule to be applied to each of image blocks of a predetermined size obtained by dividing each of the above described still picture frames. Numeral 34 denotes an insertion information file for storing watermark information to be embedded in each of still picture frames forming a moving picture. Numeral 35 denotes an information insertion moving picture file for storing moving picture data with watermark information embedded therein.

Furthermore, numeral 21 denotes an input/output routine. The input/output routine 21 functions to write moving picture data inputted from the input/output device 1 by a user and distributed from, for example, DVD recording or a server, rule data, and watermark information into the above described files 31, 32 and 34. The input/output routine 21 also functions to read out moving picture data with watermark information already embedded therein from the information insertion moving picture file 35. The input/output routine 21 also functions to output it to a display screen of the input/output device 1. Numeral 20 denotes a control routine. The control routine 20 functions to start the input/output routine. For each of still picture frames forming a moving picture, the control routine 20 then function to successively start an inter-still-picture-frame motion detection routine 22, a rule selection routine 23, a change position determination routine 24, and a pixel state change routine 25 described later, and thereby implement watermark information embedding.

The inter-still-picture-frame motion detection routine 22 compares each still picture frame (hereafter referred to as target frame) being noticed as the subject of watermark information embedding with a still picture frame (hereafter referred to as reference frame) appearing K (where K is a positive integer) frames after on the time axis, and thereby detects a motion of the subject included in the target frame. This motion detection processing will be described in detail later by referring to FIG. 3. In the motion detection processing, the target frame is divided into a plurality of image blocks each having a predetermined size, such as, for example, 16 pixels by 8 pixels (=128 pixels). For each of the image blocks, a motion vector between it and its reference vector is determined. Here, the reference frame may be either of the future direction and the past direction. The value of a parameter K indicating the frame interval between the target frame and the reference frame (for example, K=10) can be arbitrarily specified by a user of the present system.

Figure 6:
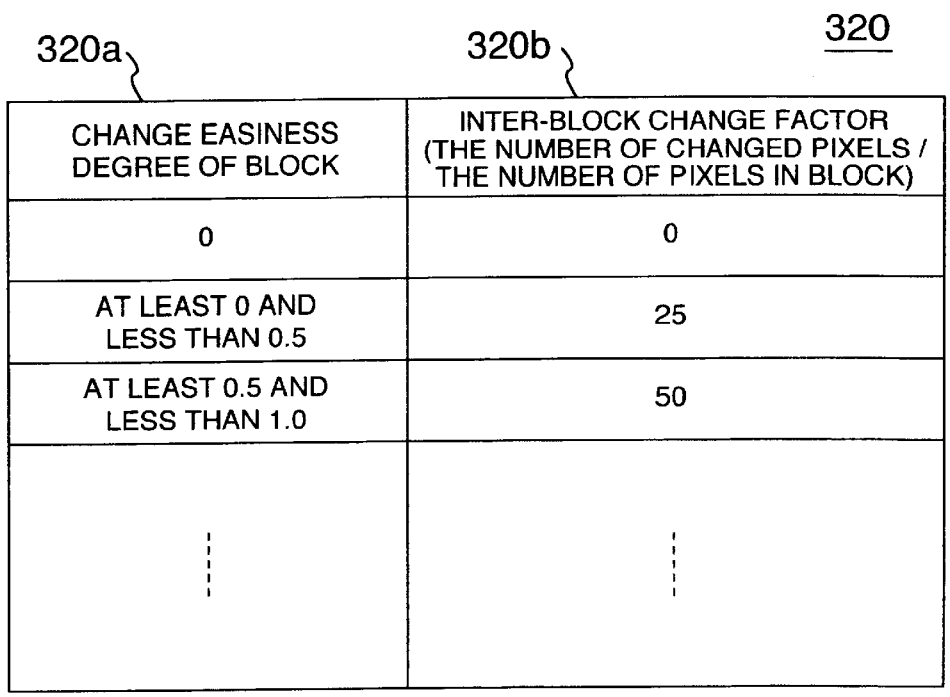
FIG. 6 is a diagram showing an example of an information embedding rule.

The rule selection routine 23 receives the motion vector of each image block, selects one out of a plurality of rules stored in the rule set file 32, according to the magnitude of the motion vector, and stores it in the usage rule file 33 as one of application rules classified by blocks. For example, by viewing the magnitude of the motion vector and referring to a rule table as shown in FIG. 6, the rule selection routine 23 selects a pertinent rule and puts it into the usage rule file 33.

As described in detail with reference to FIG. 7, the change position determination routine 24 analyzes a still picture included in the target frame, and derives a change easiness degree of each image block. According to the change easiness degree and an application rule taken out from the usage rule file 33, the change position determination routine 24 then determines luminance change positions (pixels) and/or change quantities of each of image blocks in the target frame.

The change routine 25 receives the luminance change positions (pixels) and/or the change quantities of each of image blocks of the target frame from the change position determination routine 24. According to watermark information (bits) specified by the insertion information file 34, the change routine 25 then changes a state (luminance) of a specific pixel included in the above described image block.

For example, if each of still picture frames forming the moving picture has 720 by 480 pixels and it is divided into 16 by 8 pixel units, then one frame is divided into 45 by 60 (=2700) blocks. In the case where watermark information embedded in the above described frame is set to 6-bit information (character codes of 64 kinds represented by numerical values 0 to 63), 450 blocks can be assigned to each bit.

If the above described 2700 blocks forming one frame is divided into N groups associated with N character codes, and 2700/N blocks are assigned to the above described 6-bit information in each group, then 450/N blocks can be assigned to each bit.

Each of bits of a bit pattern forming watermark information is associated with a plurality of image blocks in mutually dispersed position relations in the still picture frame beforehand. For example, when writing bit information "1" in a certain bit position, luminance is brightened by a specified quantity in pixel positions specified by the change position determination routine 24 in a plurality of image blocks associated with the bit position. When writing bit information "0", the luminance is darkened by a specified quantity in pixel positions specified by the change position determination routine 24. As a result, N character codes can be embedded in each frame as watermark information.

Depending upon the state of the image in the frame, such a block that a luminance change is not permitted also appears. If a plurality of image blocks in mutually dispersed position relations in the frame are assigned to each bit beforehand, however, then stochastically it becomes possible to make a luminance change in at least one block and watermark information can be certainly inserted.

As for the association relations between the above described image block and bit information, the relations are converted into a table, and the table is stored in the insertion information file 35 beforehand. By referring to the insertion information file 35, therefore, the change routine 25 can make a decision on information to be written into each block.

Instead of the above described 6-bit information, information of an arbitrary number of bits, such as, for example, 8-bit information may be applied to the watermark information. Furthermore, instead of associating each bit with image blocks as described above, it is also possible to, for example, associate each of 64 character codes which can be represented by the 6-bit information with image blocks beforehand and change pixel states of associated image blocks according to whether there is a character code or not. As for the luminance states of each pixel, it is now assumed that there are, for example, 128 gradations, i.e., gradations 0 through 127. Instead of changing the gradation of luminance by a specified quantity with respect to each pixel specified as a change position, it is also possible in this case to fix the luminance change of each pixel to one gradation and vary the number of pixels changed in luminance according to the above described specified quantity.

Figure 3:
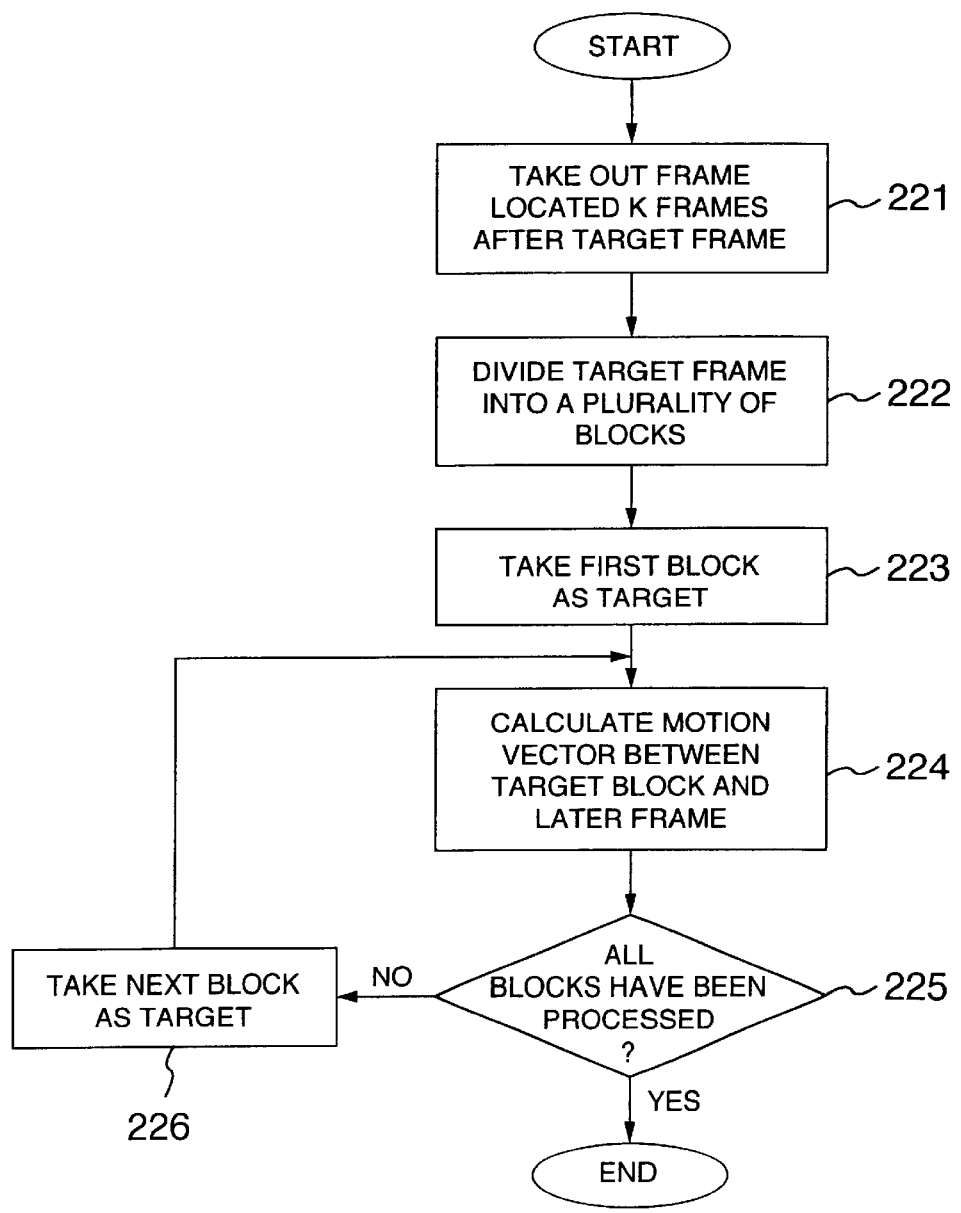
FIG. 3 is a flow chart showing details of an inter-still-picture-frame motion detection routine 22 illustrated in FIG. 2.

FIG. 3 shows a detailed flow chart of the inter-still-picture-frame motion detection routine 22.

Motion detection needed here can be implemented by a known technique shown in, for example, "Foundation of Digital Image Compression," published by Nikkei BP Publication Center in 1996, pp. 44–47. A result of motion detection is represented by a motion vector and least square sum of difference of a subject image. By using both of these values, precise information insertion control according to an image motion becomes possible. For brevity of description, however, the result of motion detection will be represented by the motion vector and the least square sum will be omitted in the following description. However, the motion detection in the present invention should not be limited to only the motion vector.

As shown in FIG. 3, a later frame located K frames after the target frame is first taken out from the moving picture file 31 as a reference frame (step 221). The target frame is divided into blocks each having 16 by 8 pixels (step 222). A first block of the target frame is taken out as a target block (step 223). A motion between the target block and the above described later frame is detected, and the motion vector thus determined is delivered to the rule selection routine 23 (step 224). Subsequently, it is determined whether all divided blocks of the target frame have been processed (step 225). If all divided blocks have been processed, this routine is terminated. Otherwise, the next block is set to the target block (step 226), and the motion vector step 224 is repeated.

As a result of the above described motion detection between still picture frames, a motion vector table 220 indicating a motion vector 220b in association with each block 220a of the target frame is formed as shown in FIG. 4, and its contents are given to the rule selection routine 23 by the inter-still-picture-frame motion detection routine 22.

For example, as shown in FIG. 5, the rule selection routine 23 has a plurality of decision criterions R1, R2 and R3. According to the magnitude of the motion vector, the decision criterions specify an intensity specification table to be selected. For each of the blocks included in the target frame, the rule selection routine 23 takes out a rule (FIG. 5) associated with a motion vector quantity (absolute value) detected by the inter-still-picture-frame motion detection routine 22 from the rule set file 32, and stores the rule in the usage rule file 33 so as to be associated with the image block.

For example, as shown in FIG. 6, a rule (intensity specification table) 320 prepared in the rule set table 32 defines relations between the degree 320a of change easiness of a block in a still picture frame and an intra-block change factor 320b. For each block, the change easiness degree 320a indicates to what extent the luminance can be changed while maintaining inconspicuousness. Here, the change easiness degree 320a is represented by an average value of a luminance change quantity per pixel permitted in each block, i.e., the number of gradations in the above described 128 gradations a luminance change corresponding to which is permitted per pixel. The intra-block change factor 320b indicates a percentage of changed pixels in one block.

If a plurality of pixel candidates which can be changed in stage have been found in one block of a still picture frame, as many pixels as the number specified by the intra-block change factor are selected out of the plurality of pixel candidates as subject pixels of a luminance change as described later. Therefore, the above described change factor specifies positions of pixels to be changed and the degree of pixel change in the block at the same time.

The decision criterions R1, R2, R3, . . . describe relations (the intensity specification table 320) between the motion vectors and rules so that in a block having a larger motion vector a rule having a higher intra-block change factor may be applied to the same easiness degree.

Figure 7:
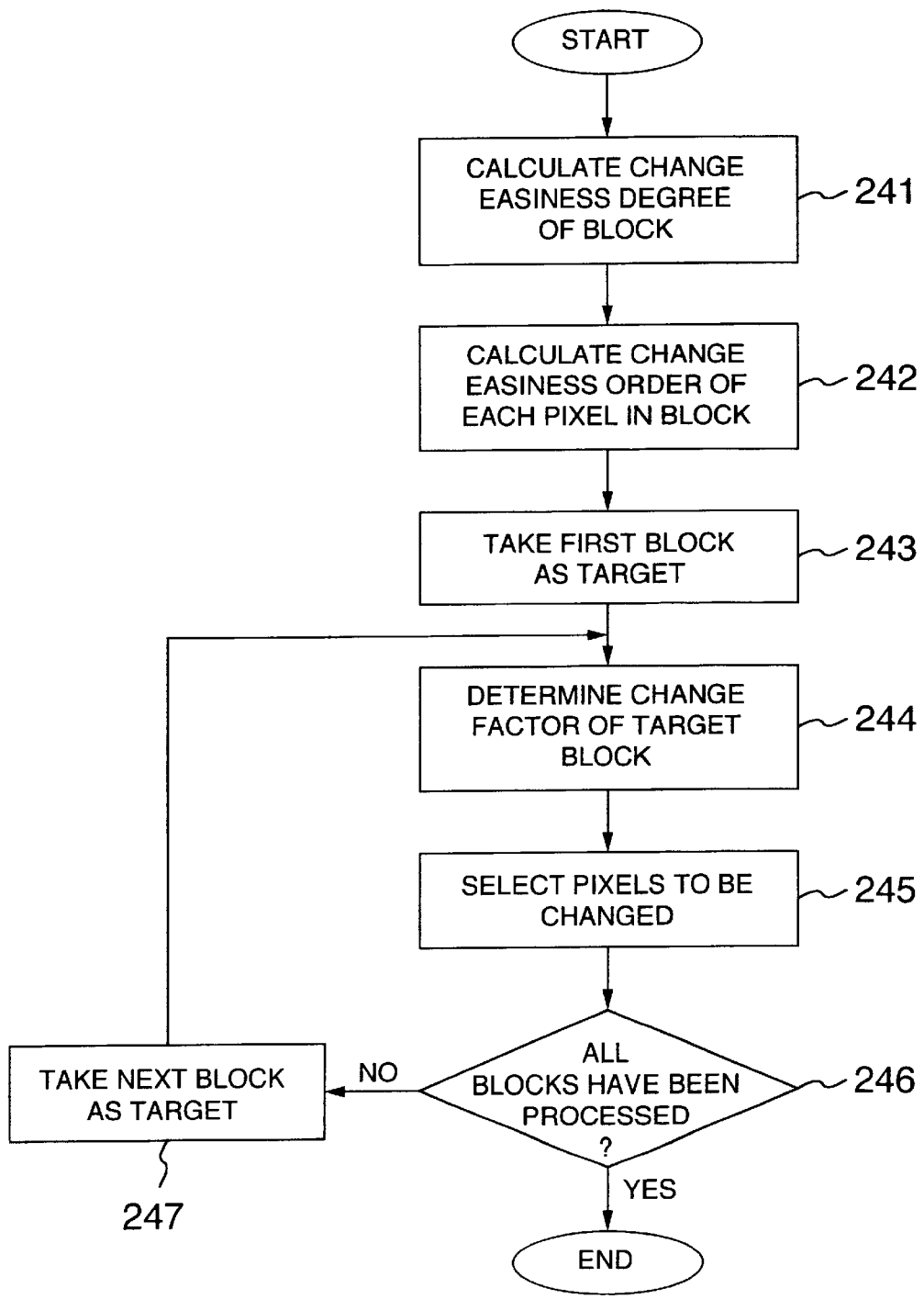
FIG. 7 is a flow chart showing details of a change position determining routine 24 illustrated in FIG. 2.

FIG. 7 shows a detailed flow chart of the change position determination routine 24.

For each block of the target frame, the change easiness degree is first determined according to, for example, the following procedure (step 241). On each target frame, noise rejection (pixel value change) processing is conducted in such a range that it cannot be perceived by human eyes and it does not disturb the reference to contents, by using image filtering having characteristics described in, for example, The Transactions of the Institute of Electronics, Information and Communication Engineer (IEICE), Vol. J79-D-2, No. 8, pp. 1347–1353. By determining a difference between an image after filtering and its original image, image data (hereafter referred to as difference image frame) indicating change quantities is generated. Since the above described filtering is image processing in such a range that it does not disturb the reference to contents, the above described difference image frame indicates candidate positions and change quantities of a pixel value change permitted for the target frame. Therefore, by dividing the above described difference image frame into a plurality of blocks in the same way as the target frame, determining an accumulated value of pixel values (luminance change quantities) for each block, and dividing the accumulated value by the number of block pixels, an average luminance change quantity per pixel of each block, i.e., the change easiness degree 320a shown in FIG. 6 is determined.

Subsequently, by selecting pixels in order beginning with a pixel having a large pixel value in each block of the above described difference frame, change easiness order of pixels is determined (step 242). If changes are made in two pixels p1 and p2 in the block with the same luminance quantity and p1 is higher in change easiness order than p2, then p1 is more inconspicuous in luminance change than p2.

In this state, a first block of the target frame is taken out (step 243). From the usage rule file 33, a rule (table 320) associated with the target block is read out. In accordance with the above described rule, an intra-block change factor 320b associated with the change easiness degree 320a of the first block already calculated at the step 241 is determined (step 244). As a result, it is determined how many pixels among 128 pixels included in the target block should be changed. In the order in which the change easiness order determined at the step 242 is decreased, as many pixels as the number indicated by the above described intra-block change factor 320b are then selected and reported to the change routine 25 (step 245). Thereafter, it is determined whether processing has been conducted on all blocks of the target frame (step 246). If all blocks have been processed, then this routine is terminated. Otherwise, the next block in the target frame is set to the target block (step 247), and the processing returns to the change factor determination step 244.

In the change routine 25, watermark information to be written into the target block is specified by referring to the insertion information file 34. Furthermore, on a pixel specified by the change position determination routine 24 out of 128 pixels included in the target block, a luminance change associated with the watermark information is conducted.

In the above described embodiment, the change quantity is controlled by fixing the luminance change quantity of each pixel to one gradation and changing the number of luminance-changed pixels in a target block.

As described above, however, it is also possible to conduct variable control on the luminance change quantity of each pixel.

As described above, in the present embodiment, an application rule is selected depending upon a motion vector (property as viewed as a moving picture) indicating a relation between still picture frames forming a moving picture. Furthermore, out of pixels which can be changed in luminance depending upon the state (property as viewed as a still picture) of a subject included in each of blocks in a still picture frame, pixels to be changed in luminance are determined on the basis of the selected rule. In the present embodiment, therefore, both the property as viewed as a moving picture and the property as viewed as a still picture are reflected when determining the pixel state change positions and/or change quantities for inserting watermark information. As a result, watermark information embedding with suppressed image quality degradation and improved information survivability becomes possible.

FIG. 8 shows a variation of the rule 320 shown in FIG. 6.

In this example, a luminance change quantity 320c of each pixel, besides the intra-block change factor 320b, is defined beforehand in association with the change easiness degree 320a of the block. In a frame having a motion in which a luminance change is inconspicuous, therefore, watermark information can be embedded in such a form that not only the number of changed pixels but also change quantities of individual pixels are increased.

Figure 9:
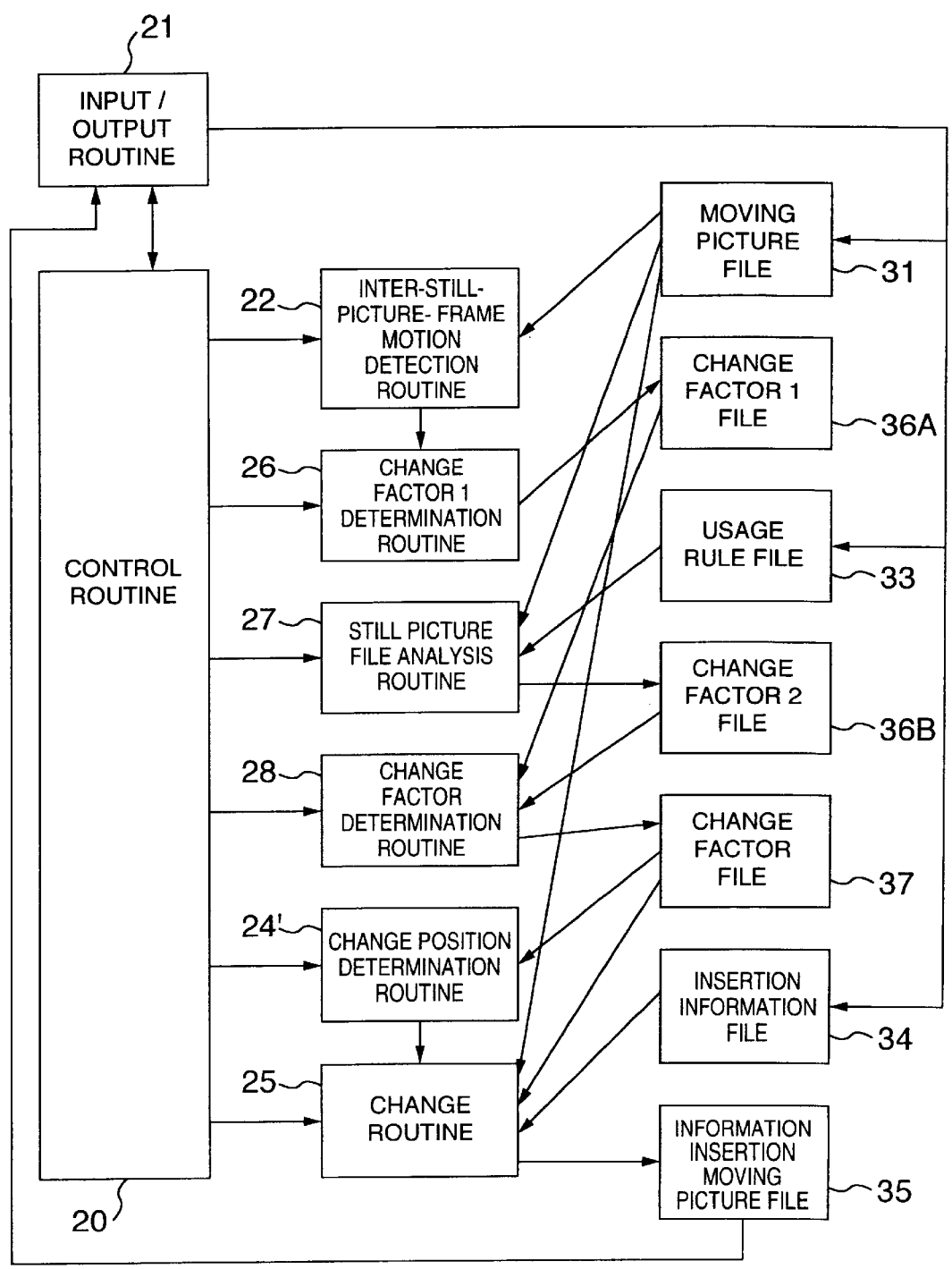
FIG. 9 is a functional block diagram showing a digital watermark information embedding according to another embodiment of the present invention.

FIG. 9 shows a functional block diagram of a digital watermark information embedding according to the second embodiment of the present invention.

Functional blocks 20 through 28 are processing routines (programs) executed by the central processing unit 2. Functional blocks 31 through 37 show data files formed in the storage device 3. Components common to those of the first embodiment described with reference to FIG. 2 are denoted by like characters. In the first embodiment, a plurality of rules are prepared in the rule set file 32, and an application rule is selected according to the motion vector block by block in the target frame. In the present embodiment, however, one rule 320 stored in the usage rule file 33 beforehand is applied to all blocks.

Depending upon the motion vector magnitude of each of blocks in the target frame received from the inter-still-picture-frame motion detection routine 22, a change factor 1 determination routine 26 determines an intra-block change factor of each target block and stores its result in a change factor 1 file 36A. The above described determination of the intra-block change factor can be implemented by referring to a conversion table. The conversion table stores relations between the magnitude of the motion vector and the change factor defined beforehand so as to increase the change factor as the motion vector becomes larger.

By processing similar to that of the change position determination routine 24 described with reference to FIG. 2, a still picture frame analysis routine 27 calculates a change easiness degree 320a, and determines a change factor 320b in the target block according to a rule 320 prepared in a usage rule file 33. The still picture frame analysis routine 27 stores its result in a change factor 2 file 36B.

For the same target block, in the present embodiment, a change factor determination routine 28 selects either a change factor 1 determined according to a motion vector which is a property as viewed as a moving picture, or a change factor 2 determined according to a change easiness degree which is a property as viewed as a still picture. If, for example, it is desired to give priority to the image quality after a luminance change, then the change factor determination routine 28 selects a change factor having a smaller value out of the above described two change factors, and stores it in a change factor file 37. If it is desired to give priority to the survivability of watermark information after embedding, then the change factor determination routine 28 may select a change factor having a larger value out of the above described two change factors.

By using a method similar to the change position determination routine 24 in the first embodiment, a change position determination routine 24' derives pixels which are included in the target block and which can be changed in luminance. By using the change factor set in the above described change factor file 37 instead of the application rule in the usage rule file 33, the change position determination routine 24' selects a predetermined number of pixels in order of change easiness, beginning with the highest change easiness. The change position determination routine 24' notifies a change routine 25 of the selected pixels as subject pixels of the luminance change.

The second embodiment makes possible watermark information embedding with suppressed image quality degradation and improved information survivability by selectively applying the first change factor depending upon the motion vector which is the property as viewed as a moving picture and the second change factor depending upon the image state which is the property as viewed as a still picture, as described above.

Figure 10:
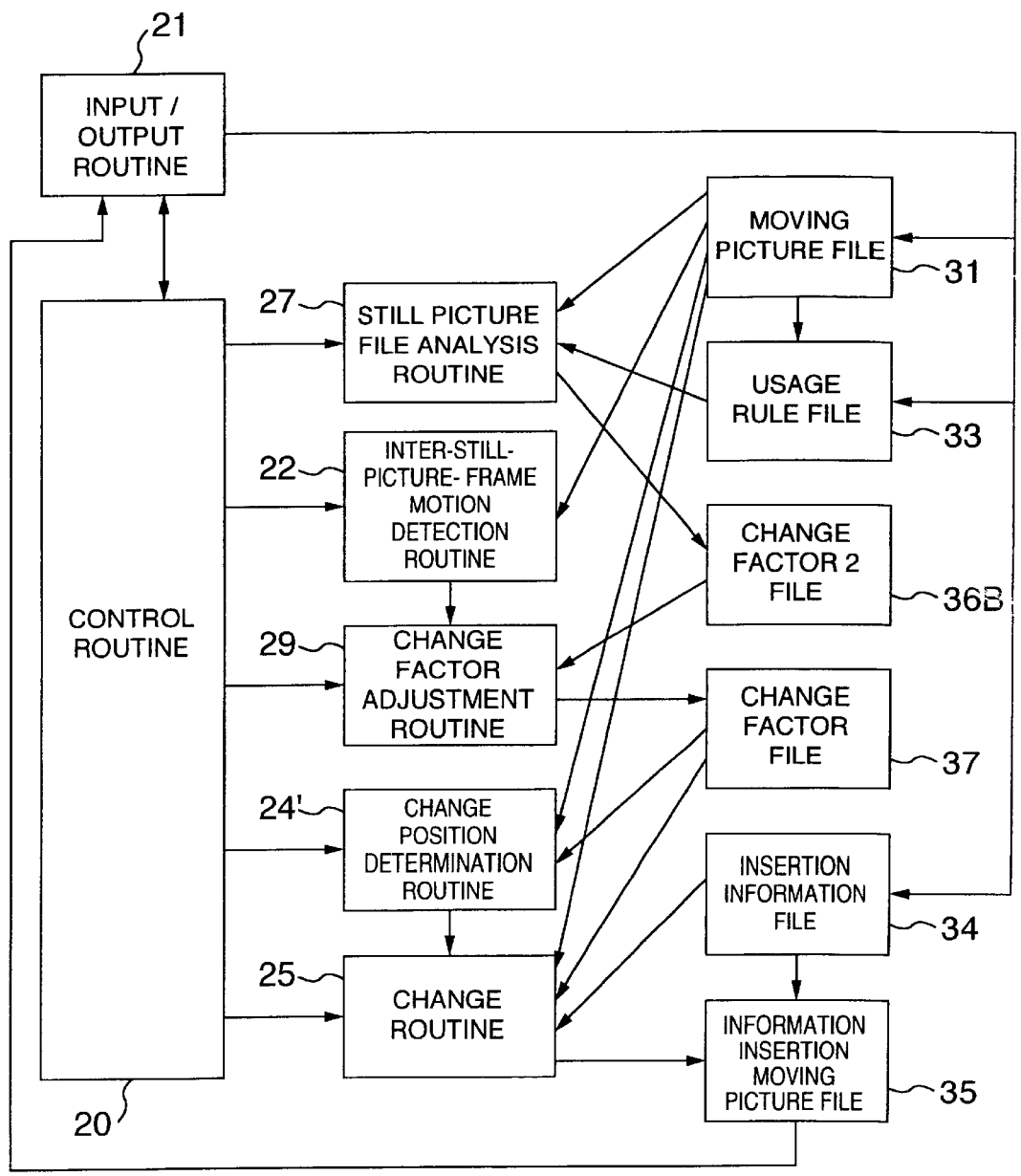
FIG. 10 is a functional block diagram showing a digital watermark information embedding according to a further embodiment of the present invention.

FIG. 10 is a functional block diagram showing a digital watermark information embedding according to the third embodiment of the present invention.

Functional blocks 20 through 28 show processing routines (programs) executed by the central processing unit 2. Functional blocks 31 through 37 show data files formed in the storage device 3. Components common to those of the first and second embodiments described with reference to FIGS. 2 and 9 are denoted by like numerals.

In the same way as the second embodiment, a still picture frame analysis routine 27 determines a change factor of each block on the basis of the property of the target frame as viewed as a still picture, and stores it in a change factor 2 file 36B. Depending upon a motion vector of each block received from an inter-still-picture-frame motion detection routine 22, a change factor adjustment routine 29 increases or decreases the value of a change factor 2 read out from the change factor 2 file 36B, and stores a result in a change factor file 37 as an application change factor. A change position determination routine 24' applies the change factor stored in the change factor file 37, determines subject pixels of luminance changes in the same way as the second embodiment, and notifies a change routine 25 of the subject pixels.

In the above described third embodiment, the change factor 2 depending upon the property viewed as a still picture is adjusted according to the motion vector which is the property as viewed as a moving picture, thereby a final application change factor is determined, and pixels changed in luminance are determined.

With the reference to the first through third embodiments, the information embedding method of determining the watermark information embedding positions in a moving picture by reflecting both the property as viewed as a moving picture and the property as viewed as a still picture have been described. However, the technical thought of the present invention is not limited to the above described embodiments. For example, the technical conception of the present invention can be applied also to other embodiments in which information embedding positions are determined on the basis of two different properties possessed by contents, such as a luminance variation and a color variation in watermark information embedding in a still picture, and to other contents represented by voices, other than picture images.

The watermark information embedding execution program (routine) in the above described embodiments can be stored in a recording medium, such as a semiconductor memory, a CD-ROM, or an optical storage. Alternatively, the program may be loaded from an external source to a memory of the apparatus of the embodiment via a transmission medium such as a network.

Furthermore, in the above described embodiments, the present invention method is implemented by execution of software (routines 20 through 29) in the central processing unit 2. However, a part of these software functions may also be implemented by dedicated hardware.

Another mode for carrying out the present invention includes a contents medium such as a CD, a DVD or the like for recording watermark information embedded in contents information such as still picture data, moving picture data, or voice data in accordance with the watermark information embedding method specified in the above described embodiments. The watermark information may include contents management information such as contents reproduction inhibition, permission of a once reproduction, contents usage special contract, or identification of contents' possessors and their supply destinations. Contents containing the embedded information specified by the present invention may also be distributed from a distribution source via a transmission medium.

As evident from the foregoing description, state change positions and/or degrees of change are optimized in the present invention on the basis of a plurality of properties possessed by the contents. As a result, watermark information embedding becomes possible while suppressing the degradation of contents values such as image quality and tone quality and increasing the survivability of the embedded information. Furthermore, in the case where the present invention is applied to moving picture (e.s. video) data formed of a plurality of still picture frames arranged in time series, pixel state change positions and/or change quantities can be optimized. As a result, watermark information embedding with survivability becomes possible without bringing the image quality degradation to notice.

What is claimed is:

1. An information embedding method comprising the steps of:

determining a plurality of degrees of change states of information included in contents information serving as an embedding subject of watermark information respectively depending upon a plurality of properties possessed by contents information serving as an embedding subject of watermark information;

selecting degrees of change to be applied to each of sub-contents information pieces representing divisional contents information in accordance with said contents information, among said plurality of degrees of change determined based on said respective properties;

making a change serving as watermark information of said information included in said contents information in accordance with said selected degrees of change, and dividing contents information serving as an embedding subject of watermark information into a plurality of information blocks;

determining said plurality of sets of degrees of change for each of the information blocks; and selecting for each of information blocks, at least one set composed of degrees of degrees in accordance with contents information of the information block.

2. An information embedding method comprising:

a first step of determining degrees of change states of information included in contents information serving as an embedding subject of watermark information based on a first property possessed by said contents information serving as an embedding subject of watermark information;

a second step of modifying at least a part of degrees of change determined at said first step, based on a second property possessed by said contents information different from said first property; and a third step of making a change serving as watermark information of said information included in said contents information in accordance with said modified at least a part of degrees of change.

3. An information embedding method comprising:

a first step of selecting at least one among a plurality of rules prepared beforehand, based on a first property possessed by contents information serving as an embedding subject of watermark information;

a second step of determining degrees of chance of information included in said contents information based on the at least one rule selected at said first step and a second property possessed by said contents information; and a third step of changing a state of said information included in said contents information in accordance with said selected degrees of change.

4. An information embedding method according to claim 3, comprising the steps of:

dividing contents information serving as an embedding subject of watermark information into a plurality of information blocks;

selecting at least one of said plurality of rules for each information block; and determining said degrees of change for said each information block in accordance with said selected at least one rule.

5. An information embedding method according to claim 3, wherein said plurality of rules define relations between a first parameter indicating a degree of change easiness of said contents information and a change factor, said second step comprising the steps of:

calculating a value of a first parameter indicating said degree of change easiness based on the determined degrees of change; and selecting as many degrees of change as a number based on a change factor associated with said first parameter value indicated by said selected at least one rule.

6. An information embedding method of embedding watermark information by making a change in moving picture data formed of a plurality of still picture frames, said information embedding method comprising:

a first step of determining degree of change candidates of pixel included in contents information serving as an embedding subject of watermark information based on a property specific to still picture, detected from a still picture frame to be processed;

a second step of determining degrees of change based on a property specific to moving picture, detected from a relation between images contained in said still picture frame to be processed and another still picture frame;

a third step of selecting degrees of change to be applied to said still picture frame among the determined degree of change candidates respectively determined at said first and second steps; and a fourth step of making a pixel change serving as watermark information in said still picture frame to be processed in accordance with said selected degrees of change.

7. An information embedding method according to claim 6, wherein each of said still picture frames is divided into a plurality of image blocks, and said first, second, third and fourth steps are executed for each of the image blocks.

8. An information embedding method of embedding watermark information by making a change in moving picture data formed of a plurality of still picture frames, said information embedding method comprising:

a first step of determining degrees of change of information included in contents information serving as an embedding subject of watermark information based on a property specific to still picture, possessed by each of said still picture frames;

a second step of modifying at least a part of the degrees of change determined at said first step, based on a property specific to moving picture, determined from a relation between said still picture frames; and a third step of making a pixel change serving as watermark information in said still picture frame in accordance with said modified degrees of change.

9. An information embedding method of embedding watermark information by making a change in moving picture data formed of a plurality of still picture frames, said information embedding method comprising the steps of:

a first step of determining at least one rule out of a plurality of rules prepared beforehand, based on a property specific to moving picture, detected from a relation between images contained in said still picture frame to be processed and another still picture frame;

a second step of determining degrees of change of pixels included in said still picture frame based on a property specific to still picture, detected from said still picture frame to be processed and the determined at least one rule in said rule determining step; and a third step of changing pixel states of said still picture frame in accordance with said determined degrees of change.

10. An information embedding method according to claim 9, comprising the steps of:
- dividing each of said still picture frames into a plurality of image blocks;
- selecting at least one of said plurality of rules for each image block; and
- determining degrees of change for said each image block in accordance with said selected at least one rule.

11. An information embedding method of embedding watermark information by making a change in moving picture data formed of a plurality of still picture frames, said information embedding method comprising the steps of:
- a first step of determining at least one rule among a plurality of rules prepared beforehand, based on a property specific to moving picture, detected from a relation between images contained in said still picture frame to be processed and another still picture frame;
- a second step of determining degrees of change candidates of pixels included in said still picture frame, based on a property specific to still picture, detected from said still image frame to be processed and the determined at least one rule in said rule determining step; and
- a third step of selecting at least one change position and degree of change among said candidates using said determined at least one rule; and
- a fourth step of changing pixel states of said still picture frame in accordance with said determined degrees of change.

12. A storage medium for storing contents information with watermark information embedded therein which is obtained by the method defined in claim 8.

13. A storage medium for storing contents information with watermark information embedded therein which is obtained by the method defined in claim 9.

14. Contents information on a reproducible and readable medium containing watermark information generated by the method defined in claim 8.

15. Contents information on a reproducible and readable medium containing watermark information generated by the method defined in claim 9.

16. A computer program, on a computer readable medium, for embedding watermark information by making a change in a part of moving picture data formed of a plurality of still picture frames, said computer program comprising:
- a program section for determining degrees of change of pixels included in contents information serving as an embedding subject of watermark information based on a property specific to still picture, possessed by each of said still picture frames;
- a program section for modifying at least a part of the degrees of change determined by execution of said program section, based on a property specific to moving picture, determined from a relation between said still picture frames; and
- a program section for making a pixel change serving as watermark information in said still picture frame in accordance with said modified degrees of change.

17. A computer program, on a computer readable medium, for embedding watermark information by making a change in moving picture data formed of a plurality of still picture frames, said computer program comprising:
- a program section of determining at least one rule among a plurality of rules prepared beforehand, based on a property specific to moving picture, detected from a relation between images contained in said still picture frame to be processed and another still picture frame;
- a program section of determining degrees of change of pixels included in said still picture frame based on a property specific to still picture, detected from said still image frame to be processed and the determined at least one rule in said rule determining step; and
- a program section for changing pixel states of said still picture frame in accordance with said determined degrees of change.

* * * * *